United States Patent Office 2,929,811
Patented Mar. 22, 1960

2,929,811

STARCH PRODUCTS OF STABLE VISCOSITY

Bernard T. Hofreiter, Charles L. Mehltretter, James Bennie, and George Earle Hamerstrand, all of Peoria, Ill., assignors to the United States of America as represented by the Secretary of Agriculture No Drawing. Application November 28, 1958
Serial No. 777,549

6 Claims. (Cl. 260—233.3)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the production of starch products of improved stability. More specifically, it relates to novel and useful starch derivatives characterized by their ability to form cooked pastes of high stability and clarity, to have greater resistance to gelling of the pastes upon cooling, and to regain their original hot paste viscosity upon reheating the cold pastes as compared to untreated raw starch.

In Patent No. 2,894,945 dialdehyde starch formed by reaction of starch with periodate was oxidized with chlorous acid under specific conditions for the essentially complete conversion of the aldehyde groups to carboxyl groups which products after neutralization are named dicarboxyl starches. This class of novel products are starch derivatives in granular form possessing valuable properties of cold water solubility with high viscosity and clarity. Aqueous pastes of the above products are suitable for use at lower temperatures where moderate stability is attained. However they are not applicable where viscosity stability at high temperatures over extended periods of time is required.

We have now discovered that when starch is first reacted to a minor extent with epichlorohydrin, that is, one mole equivalent of the starch is reacted with from 0.0005 to .005 mole equivalent of the epichlorohydrin, and then consecutively oxidized with periodate and chlorous acid, respectively, cross-linked dicarboxyl starches are obtained whose alkali or ammonium salts in aqueous solution show remarkably improved viscosity stability at high temperatures over prolonged periods of time.

It is known in the art that starch can be reacted with epichlorohydrin, formaldehyde and other cross-linking agents. Such products are not gelatinizable except under immoderate conditions. When slightly cross-linked, pastes of extremely high viscosity are obtained. Highly cross-linked starch forms a two-phase system containing precipitated unswollen starch granules which have no appreciable viscosity characteristics. It is also known that polysaccharides can be successively oxidized with periodate and chlorous acid to yield dicarboxylated products. Dicarboxyl starches, prepared in accordance with said Patent No. 2,894,945, are readily gelatinized in hot aqueous dispersions to give pastes of high initial viscosity and clarity. However, during heating of the pastes at approximately 92° C. the viscosity is greatly reduced in a short time as previously described. The novelty of our invention is that a combination of etherification with epichlorohydrin and oxidation with periodate and chlorous acid produces a new starch modification whose function is completely different than that of etherified starch, and a decided improvement over that of the non-cross-linked dicarboxyl starches. The outstanding viscosity stability performance of the epichlorohydrin etherified dicarboxyl starches is obtained by a proper and delicate balance of cross-linking and dicarboxyl content.

Viscosity stability of starch or modified starch pastes at temperatures close to the boiling point of water for prolonged periods of time is of the greatest importance in many industrial uses of starch products. Uniformity of hot paste viscosity is required in starch derivatives used in the formulation of adhesives in order to maintain a coating of the adhesive film of uniform thickness on modern high-speed gluing machine rolls. Stability of hot paste viscosity is also of importance in the high-speed coating of paper for the same reason. As another illustration we have the sizing and finishing of textiles in which the extent of penetration of the starch dispersion into the fiber is dependent upon its viscosity.

Of commercial importance also is the fact that such hot viscous solutions after cooling and remaining at room temperature for several days can be reheated to effect the original hot paste viscosity. It is thus possible to utilize a hot dispersion of the product in a paper coating operation and to allow unused paste to cool during the weekend shut-down of the plant and then reheat the paste to essentially its original hot viscosity and texture for use when the plant begins its regular weekly schedule.

The improved properties described are of particular value in the use of starch in the food processing and pharmaceutical industries as a thickening, stabilizing, dispersing, and suspending agent, and in paper and textile manufacturing as a sizing and coating material. Other applications are in oil drilling fluids, paints, printing inks and ceramics as a hydrocolloid additive. Still other industrial uses where stability of viscosity of aqueous dispersions of starch and its derived products are of importance will be apparent to those familiar with the art.

Of commercial significance also is the fact that the consecutive reactions of etherification and oxidation to produce the cross-linked dicarboxyl starches can be conducted in aqueous suspension at room temperature which avoids the possibility of gelatinization of the starch granules during reaction. This allows ready filtration of the final product and its intermediate products and washing of these materials with water.

It is the prime object of the present invention to stabilize starch and starch derivatives by actual chemical change in the starch structure. This chemical change is effected by cross-linking the starch by etherification with epichlorohydrin within the range of 200 to 2000 anhydroglucose units per cross-link followed by periodate and chlorous acid oxidation to the extent of from 0.5 to 5 percent dicarboxyl content. Although this range of oxidation is preferred, the invention is not limited to it. Cross-linked dicarboxyl starches from 5 to essentially 100 percent dicarboxyl content can readily be prepared but at considerably higher cost and would appear to be of value only in special cases. The cross-linked dicarboxyl starches are isolated as their neutral sodium, potassium or ammonium salts or mixtures of these salts. They may also be isolated in the free acid forms.

In order to calculate the amount of epichlorohydrin to be used the structural formula of the recurring anhydroglucose units in starch may be represented as

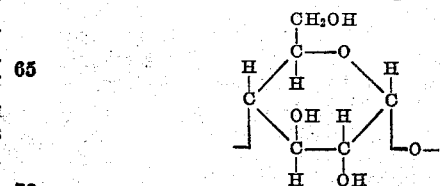

In theory it is possible to react two hydroxy groups on each recurring anhydroglucose unit (designated AGU in the figures) of the starch molecule with the reactive groups of a molecule of epichlorohydrin. Since there are 3 hydroxyl groups in an anhydroglucose unit of starch and 2 reactive groups in epichlorohydrin, there would be required 1.5 moles of epichlorohydrin per mole of starch for complete cross-linking of all of the hydroxyl groups in the anhydroglucose units of starch. A completely reacted starch could then be represented as containing 1.5 cross-links per anhydroglucose unit or 0.67 anhydroglucose units per cross-link.

The products of the invention are cross-linked to the very minor extent of 2000 to 200 anhydroglucose units per cross-link which is 0.034 percent to 0.34 percent of the reaction of all of the hydroxyl groups in starch with epichlorohydrin. Degree of cross-linking is determined by analysis of the etherified starch filtrate for unreacted epichlorohydrin. The procedures for oxidation with periodate and chlorous acid are essentially the same as those described in the aforementioned Patent No. 2,894,945. The granular state of starch is maintained throughout the above reactions and the reaction products are therefore composed of granules substantially in their original unswollen form.

The formula below represents a possible segment of the structure of the cross-linked dicarboxyl starches for illustration only where A is a cross-linked anhydroglucose unit of the modified starch, B is an anhydroglucose unit of the modified starch, and C is a dicarboxyl unit as the disodium salt of the modified starch. The formula, however, is not limited to this segment as numerous other combinations of cross-linking and dicarboxylation are obvious to those familiar with the art, for the fulfillment of the specifications described earlier, and where $n$ may vary from 200 to 2000.

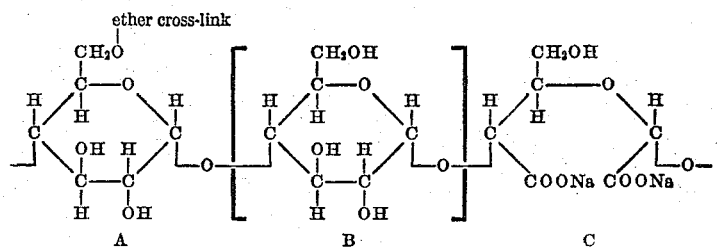

A        B        C

The following examples will further illustrate the embodiment of the invention.

Example 1

Two hundred ml. of a stock aqueous solution containing 1.33 gms. of sodium hydroxide and 33.41 gms. of anhydrous sodium sulfate was prepared. To 150 ml. of this solution 100 grams of corn starch was added and slurried by mechanical stirring in a closed system. A solution of 0.0519 gram of eipchlorohydrin in 50 ml. of the stock solution was next added to the starch slurry and the mixture stirred at 25° C. for 18 hours. The mixture was neutralized with sulfuric acid, filtered and washed with water. The degree of cross-linking was 1390 anhydroglucose units per cross-link by analysis. The wet product was slurried in 450 ml. of water and 800 ml. of water containing 1.32 grams of sodium periodate were added in 30 minutes with continuous stirring of the mixture. After 10 minutes the starch was filtered off and washed with water. The wet material was suspended in 113 ml. of water and 27 ml. of aqueous solution containing 13.33 grams of sodium chlorite and 4.2 ml. of glacial acetic acid added. After stirring at room temperature for 3 hours the reaction was complete and the mixture was filtered and the product washed 3 times with water. While suspended in the third wash a solution of 0.5 N sodium hydroxide was added until the slurry pH was 9 in order to neutralize all of the carboxyl groups. The air-dried cross-linked product had a dicarboxyl content of one percent, i.e., one anhydroglucose unit per 100 in starch had been converted to a dicarboxyl unit. Cooked aqueous pastes of the product had increased viscosity stability, water holding capacity and clarity over those of cooked pastes of the original starch and of noncross-linked one percent dicarboxyl starch.

Example 2

Two hundred ml. of a stock aqueous solution containing 1.33 gms. of sodium hydroxide and 33.4 gms. of anhydrous sodium sulfate was prepared. To 150 ml. of this solution 100 gms. of cornstarch was added and slurried by mechanical stirring. A solution of epichlorohydrin in 50 ml. of the stock solution was next added to the starch slurry and the mixture stirred at 25° C. for 18 hours. The amount of epichlorohydrin was sufficient to produce cross-linking to the extent of 610 andhydroglucose units per cross-link as determined by analysis. The mixture was neutralized with 6 N sulfuric acid from pH 11.2 to pH 2.50. Without filtering a solution of 3.96 gms. of sodium metaperiodate in 53 ml. of water was added slowly and the mixture stirred rapidly during the addition. The reaction was carried out at room temperature and allowed to continue for one-half hour. The resulting dialdehyde starch was filtered off and washed with water. The wet material was resuspended in 113 ml. water and 27 ml. of an aqueous solution containing 13.33 gms. of sodium chlorite was added very slowly to the stirred slurry. At the same time, 6 N sulfuric acid was slowly added to the reaction mixture. The relative rates of addition of the chlorite and sulfuric acid solutions were such that a pH value of near 4 was maintained. The total 6 N sulfuric acid required to bring the pH back to its original value of 3.23 was 7.8 ml. The method of isolation was the same as in Example 1. This product had a dicarboxyl content of 3 percent and its aqueous hot pastes had good viscosity stability and clarity.

Example 3

One hundred grams of starch was treated as described in Example 2 up to the conclusion of the oxidation with sodium metaperiodate. At this point instead of isolating the material the 2.7 ml. of a sodium chlorite solution containing 13.33 gms. was added directly to the dialdehyde starch slurry in the reaction mixture. The addition was made slowly with a simultaneous addition of 6 N sulfuric acid with the relative rates of addition so adjusted as to maintain the pH of the reaction mixture near 4. The isolation of this product is similar to that described in Example 1. The product was the same as the product described in Example 2.

Example 4

One hundred grams of cornstarch was cross-linked as described in Example 2 to yield 385 anhydroglucose units per cross-link. The reaction mixture was then neutralized with 6 N sulfuric acid. Without filtering, a solution of 6.60 g. of sodium metaperiodate in 53 ml. of water was added slowly and the mixture stirred rapidly during the addition. The reaction was carried out at room temperature and allowed to continue for one-half hour. The resulting dialdehyde starch was filtered off and washed with water. The wet material was re-suspended in 186 ml. water (including moisture in the filtered cake) and 44 ml. of an aqueous solution containing 22.23 gms. of sodium chlorite was added very slowly to the stirred slurry. At the same time, 6 N sulfuric acid was slowly added to the reaction mixture. The relative rates of addition of the chlorite and sulfuric acid solutions were such that a pH value of near 4 was maintained. The total 6 N sulfuric acid required was 17 ml. The product was isolated by filtration and washed two times with water. The third wash was done with 20 percent (by volume) methanol in water and while suspended, the slurry pH was adjusted to pH 9.0. One additional wash in 20 percent methanol was given prior to isolation by filtration and air drying. This product had a dicarboxyl content of 5 percent and its hot paste viscosity was the highest of the various products whose preparations are described in the various examples. Viscosity stability of the hot paste was greater than that of a comparable noncross-linked dicarboxyl starch.

We claim:

1. A modified starch in the form of ungelatinized granules having the properties of improved viscosity-stability and clarity in aqueous dispersion under normal gelatinizing conditions and of forming a reversible paste upon cooling, said modified starch being obtained by reacting one mole equivalent of unmodified starch granules with from 0.0005 to .005 mole equivalent of epichlorohydrin to etherify and intermolecularly cross-link one out of every 200–2000 anhydroglucose units and then treating the cross-linked starch successively with sodium periodate and chlorous acid to form a substantially dicarboxylated starch.

2. A modified starch according to claim 1 in which the extent of oxidation with sodium periodate is in the range 0.5 to 5 percent conversion of the anhydroglucose units in the etherified starch to dialdehyde units and in which essentially all of the dialdehyde units are subsequently oxidized with chlorous acid to dicarboxyl units.

3. The modified starch of claim 2 in which the carboxyl groups of the dicarboxyl units are present in the free acid form.

4. The modified starch of claim 2 in which the carboxyl groups of the dicarboxyl units are present as sodium salts.

5. The modified starch of claim 2 in which the carboxyl groups of the dicarboxyl units are present as potassium salts.

6. The modified starch of claim 2 in which the carboxyl groups of the dicarboxyl units are present as ammonium salts.

References Cited in the file of this patent

UNITED STATES PATENTS

| | | |
|---|---|---|
| 2,548,455 | Walker et al. | Apr. 10, 1951 |
| 2,802,000 | Caldwell et al. | Aug. 6, 1957 |
| 2,853,484 | Lolkema et al. | Sept. 23, 1958 |
| 2,894,945 | Hofreiter et al. | July 14, 1959 |

OTHER REFERENCES

Radley: The Oxidation of Starch, Manufacturing Chemist and Manufacturing Perfume, July 1942, XIII, 7 pp. 158–166.